United States Patent
Nerone et al.

(10) Patent No.: US 7,365,499 B2
(45) Date of Patent: Apr. 29, 2008

(54) CREST FACTOR REDUCTION METHOD FOR ELECTRONICALLY BALLASTED LAMPS

(75) Inventors: Louis R. Nerone, Brecksville, OH (US); Laszlo S. Ilyes, Richmond Heights, OH (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 11/321,801

(22) Filed: Dec. 29, 2005

(65) Prior Publication Data

US 2007/0152603 A1    Jul. 5, 2007

(51) Int. Cl.
*H05B 41/24* (2006.01)
(52) U.S. Cl. ..................................... 315/247
(58) Field of Classification Search .............. 315/247, 315/291, 307, 268, 270, 272, 287, 296, 311, 315/DIG. 2, DIG. 4
See application file for complete search history.

(56) References Cited

U.S. PATENT DOCUMENTS

| | | | |
|---|---|---|---|
| 4,928,038 A | 5/1990 | Nerone | |
| 6,026,126 A | 2/2000 | Gaetano | |
| 6,462,520 B1 | 10/2002 | Mangtani et al. | |
| 6,489,755 B1 * | 12/2002 | Boudreaux et al. | 323/282 |
| 6,504,423 B2 | 1/2003 | Riggio et al. | |
| 6,674,248 B2 * | 1/2004 | Newman et al. | 315/247 |
| 6,867,553 B2 | 3/2005 | Nerone et al. | |
| 6,876,157 B2 | 4/2005 | Henry | |
| 6,969,958 B2 * | 11/2005 | Henry | 315/291 |
| 7,075,251 B2 * | 7/2006 | Chen et al. | 315/291 |
| 7,187,136 B2 * | 3/2007 | Fiorello | 315/224 |
| 7,196,575 B2 * | 3/2007 | Kim | 330/10 |
| 2003/0062849 A1 | 4/2003 | Prasad et al. | |
| 2003/0122505 A1 | 7/2003 | Huber et al. | |

FOREIGN PATENT DOCUMENTS

| | | |
|---|---|---|
| DE | 199 46 253 B4 | 4/2001 |
| WO | WO 03/059022 A1 | 7/2003 |
| WO | WO 2004/045256 A1 | 5/2004 |

* cited by examiner

*Primary Examiner*—Douglas W. Owens
*Assistant Examiner*—Minh Dieu A
(74) *Attorney, Agent, or Firm*—Fay Sharpe LLP

(57) ABSTRACT

A buck converter generates a direct current (DC) bus voltage at a buck converter output. An inverter circuit is coupled to the buck converter and configured to receive the generated DC voltage and convert the DC voltage into an alternating current (AC) voltage to drive a lamp. A power control circuit is coupled to the buck converter output and configured to provide a control voltage signal to the buck converter so that the buck converter generates the DC voltage and current of a predetermined value. A crest factor reduction circuit is coupled (a) to the buck converter output to sense a rate of change in the generated DC bus voltage, and (b) to the power control circuit to modify the control voltage signal based on the sensed rate of change in the DC bus voltage.

18 Claims, 4 Drawing Sheets

CREST FACTOR REDUCTION METHOD FOR ELECTRONICALLY BALLASTED LAMPS

BACKGROUND

The present exemplary embodiment relates to electronic ballasts. It finds particular application in conjunction with the high intensity discharge lamps (HID), and will be described with particular reference thereto. However, it is to be appreciated that the present exemplary embodiment is also amenable to other electronically ballasted lamps such as fluorescent lamps and the like.

A ballast is an electrical device which is used to provide power to a load, such as an electrical discharge lamp, and to regulate its current. The ballast provides high voltage to start a lamp, causing the gas to ionize which begins the process of arc formation. Once the arc is established, the ballast allows the lamp to continue to operate by providing proper controlled current flow to the lamp.

An important indicator of lamp current quality for a high intensity discharge lamp is the current crest factor (CCF) of the lamp current. A low CCF, i.e. one that approaches unity, is preferred because a high CCF can cause the deterioration of the lamp which would subsequently reduce the life of the lamp. The crest factor of a waveform is defined as the peak divided by the RMS value. Ideally, square waves have a crest factor of unity since the RMS and the peak amplitude are equal. Typically, the ballasts which provide crest factor close to unity allow for maximum lamp life, for example 40,000 service hours. The crest factor is sensitive to the existence of sharp peaks in the waveform which are of a short time duration since the RMS value is proportional to the amount of energy in the signal. E.g., the short terms peaks do not contain much energy.

Typically, low frequency, square wave ballasts include a three stage power conversion process. Initially, at stage 1, the AC power line voltage is rectified and filtered. At the intermediate stage 2, the DC voltage is converted to DC current. At stage 3, the DC current is converted to an AC current. A commutator or inverter, which inverts the DC into the AC, periodically unloads the intermediate stage during the commutator's transition intervals. This causes the output voltage of the intermediate stage, which supplies the power to the lamp, to abruptly change to a higher level for a brief period of time. For example, the voltage abruptly jumps from 90 Volts to 120 Volts during the commutator's transition intervals. Often this causes the current crest factor to exceed the maximum set value of 1.5, during the steady-state operation, or 1.8 during warm-up.

One approach to reduce the lamp current crest factor is to use unidirectional snubber circuits.

The present application contemplates new methods and apparatuses that overcome above referenced problems and others.

BRIEF DESCRIPTION

In accordance with one aspect, a continuous mode electronic ballast for operating a lamp is disclosed. A buck converter generates a direct current (DC) output. An inverter circuit is coupled to the buck converter output and configured to receive the generated DC and convert it into an alternating current (AC) voltage to drive the lamp. A power control circuit is coupled to the buck converter and configured to provide a control voltage signal to the buck converter so that the buck converter generates the predetermined lamp power. A crest factor reduction circuit is coupled to the buck converter output to sense a rate of change in the generated DC bus voltage, and to the power control circuit to modify the control voltage signal based on the sensed rate of change in the DC bus voltage.

DETAILED DESCRIPTION

Figure 1:
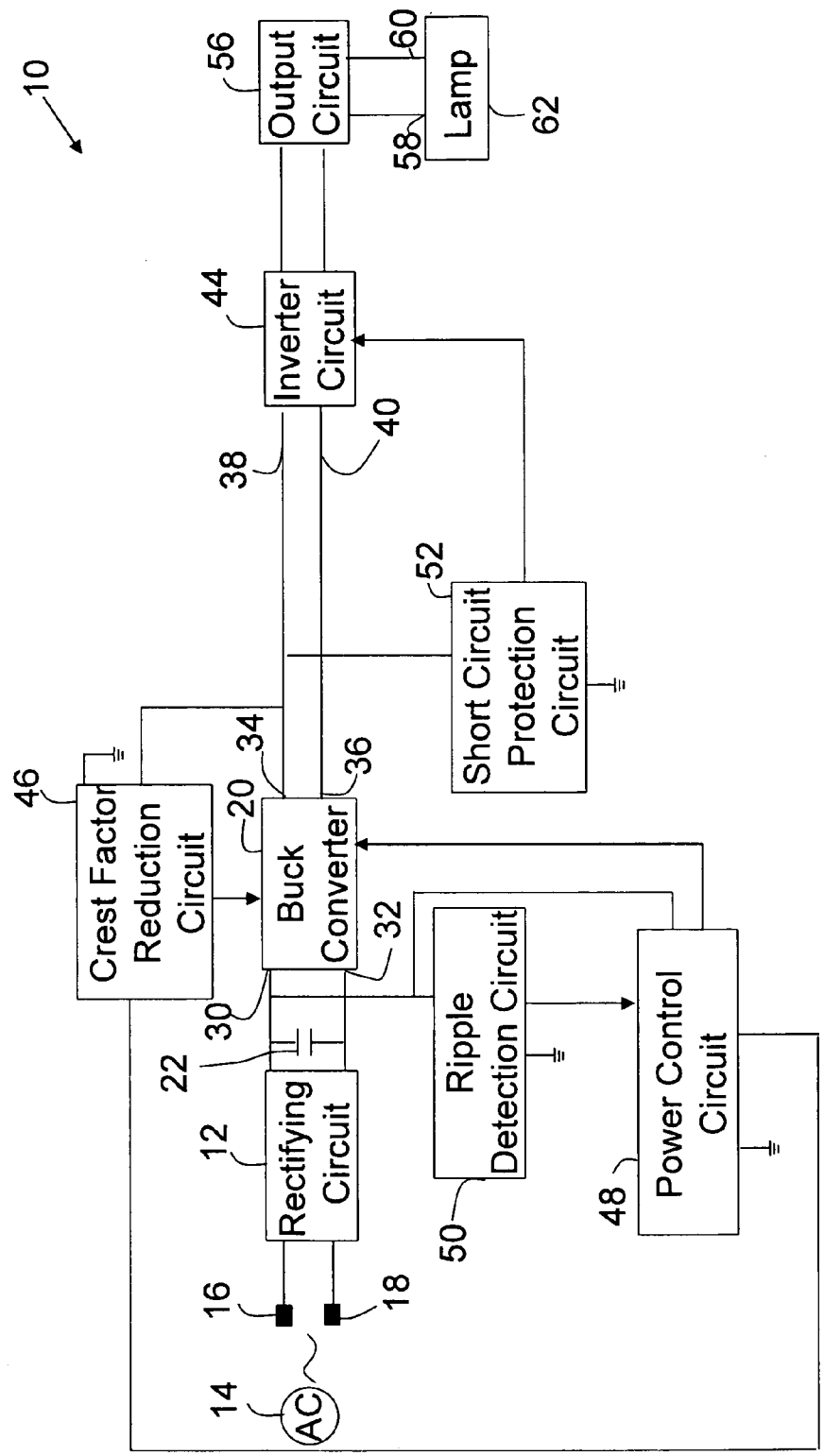
FIG. 1 is a diagrammatic illustration of a ballast.

With reference to FIG. 1, an electronic ballast 10 includes a rectifying circuit 12 which converts alternating current (AC) voltage to direct current (DC) voltage. The rectifying circuit 12 is coupled to an AC power supply 14 via a positive voltage terminal 16 and a neutral terminal 18. Typically, the line frequency of the AC power supply is 50 Hz or 60 Hz. The rectifying circuit 12 converts the AC input voltage to a full wave rectified voltage. The rectifying circuit 12 is connected to a buck converter 20 which is a direct current (DC) voltage to the direct current (DC) voltage converter. A filter capacitor or capacitors 22 are connected across positive and ground input terminals 30, 32 of the buck converter 20. Positive and negative output terminals 34, 36 of the buck converter 20 are coupled to input lines 38, 40 of an inverter circuit 44. The inverter circuit 44 converts DC to AC. A crest factor reduction circuit 46 is coupled to the buck converter positive output terminal 34 and ground to detect an increased rate of a voltage change on the inverter DC bus and to shut down the buck converter 20 for a period of time to reduce the buck converter output current as discussed in detail below. A power control circuit 48 is coupled to the buck converter positive input terminal 30 and ground to control the buck converter operation, and to a sense resistor that measures the amount of current flowing into the buck converter 20. Together, these two signals establish how much power is flowing into the buck converter, ultimately regulating the amount of power flowing into the lamp. A ripple detection circuit 50 is coupled to the buck converter positive input terminal 30 and ground to sense the AC component in the DC voltage. The AC component is twice the power line frequency due to the full wave rectifier 12. The power control circuit 48 attenuates the sensed AC voltage so that the ripple voltage is substantially reduced as discussed in detail below. A short circuit protection circuit 52 is coupled to the buck converter positive output terminal 34 and ground to detect the undervoltage and shut down the inverter circuit 44 when the lamp voltage is below a predetermined threshold as described below. The inverter circuit 44 is connected to an output circuit 56, which typically includes an inductor and a winding to pulse start the lamp. The output circuit 56 is connected to first and second load terminals or electrodes 58, 60 to drive a load 62 such as an HID lamp, a fluorescent lamp, or any other lamp operated by the electronic ballast.

Figure 2:
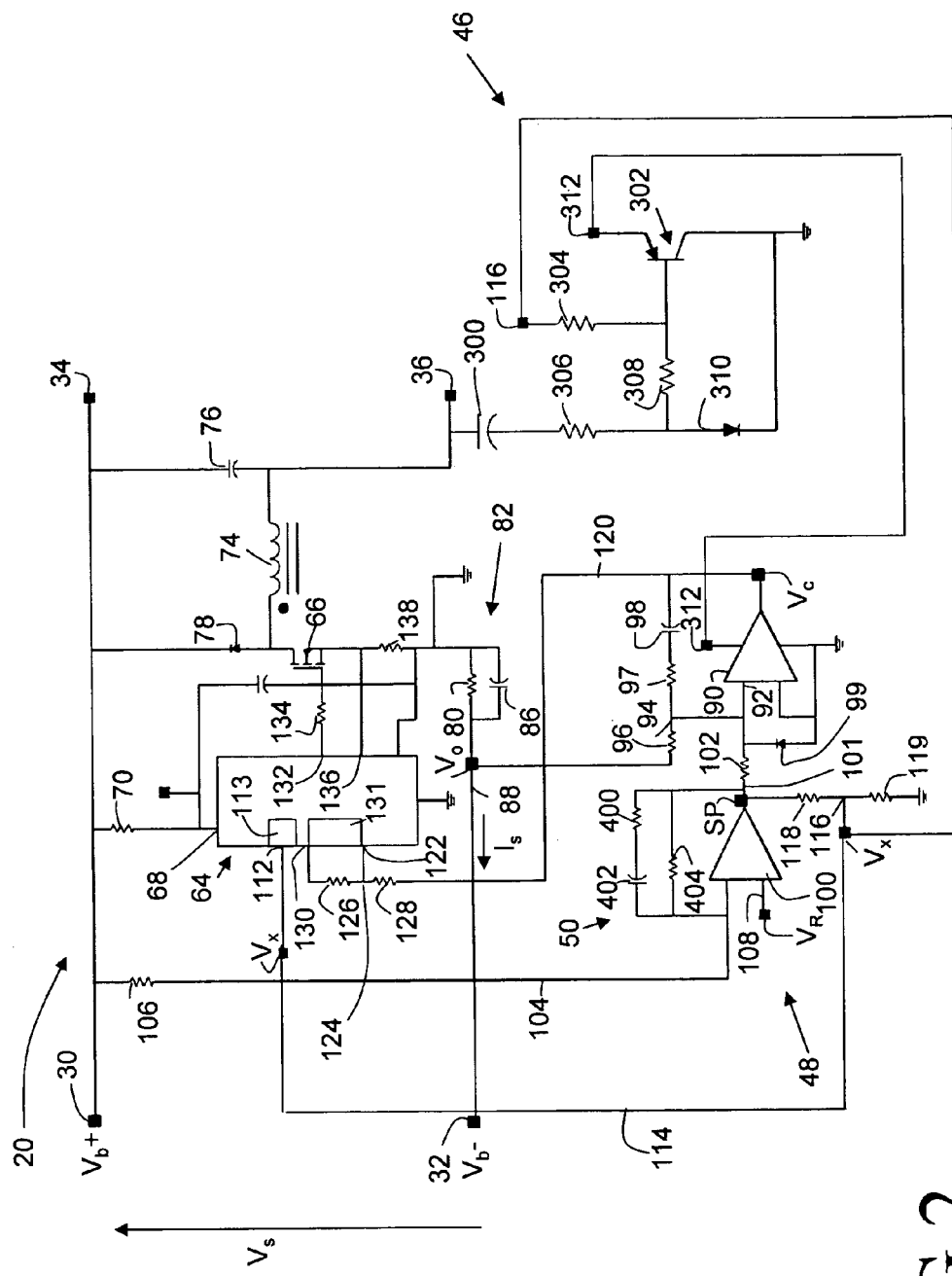
FIG. 2 is a diagrammatic illustration of a detailed portion of the ballast.

With continuing reference to FIG. 1 and further reference to FIG. 2, the buck converter 20 includes a buck converter controller 64 such as, for example, the controller manufactured by ST Electronics, PN L6562. The buck controller 64 turns ON and OFF a controllably conductive first or buck switch 66. Power is supplied to a buck controller pin 68 via a resistor 70 from the positive terminal 30. When the first switch 66 is turned ON, the input voltage is applied to a first or buck inductor 74, which is connected in series with the first switch 66. Power is delivered to the buck converter output terminals 34, 36. The current in the first inductor 74 is building up. A first or buck charging capacitor 76, which is coupled with a cathode of a first or buck freewheeling diode 78 and the first inductor 74, is charging up through the first inductor 74. When the first switch 66 is turned OFF, the current across the first inductor 74 reverses. The first diode 78 becomes forward biased. The energy stored in the first inductor 74 and first capacitor 76 is delivered to the buck converter output terminals 34, 36. Output voltage regulation is obtained by varying the duty cycle of the first switch 66. The power control circuit 48 receives a sense or converter bus voltage signal $V_s$ and a signal proportional to the buck converter input current $I_s$ via a resistor 80. By adjusting a set point SP, which is provided by the power control circuit 48 as discussed below, the sense voltage signal $V_s$ can be employed for controlling the power of the lamp 62 to track the set point SP. The voltage sense signal $V_s$ helps to regulate the power applied to the lamp when the power line voltage changes. More specifically, bus current $I_s$ is directed to a low pass filter 82 having the resistor 80 and a capacitor 86. An output voltage signal $V_o$ at an output 88 of the low pass filter 82 is representative of the average of the bus current $I_s$ and is proportional to the actual output power which is provided to the lamp 62.

An error amplifier 90 receives the output voltage signal $V_o$ at an error amplifier input terminal 92 via a resistor divider 94 which includes serially connected resistors 96, 97 and determines a difference between the output voltage signal $V_o$ and the set point voltage signal SP. A capacitor 98 is connected in series with the resistors 96, 97. A diode 99 is connected between the terminal 92 and ground.

The set point voltage signal SP is provided by a set point amplifier 100 via a set point amplifier output line 101 and a resistor 102. More specifically, the set point amplifier 100 receives as an input a voltage signal $V_b$ via a first set point amplifier input line 104 through a resistor 106. A reference voltage signal $V_R$ is provided to the set point amplifier 100 via a second set point amplifier input line 108. By employing a feedback from the input DC voltage $V_b$, the set point voltage signal SP is adjusted in accordance with the actual input line voltage $V_b$ to reduce variations in the operational voltage of the lamp 62. A control voltage signal $V_x$ for the buck controller 64 is derived from the set point voltage signal SP and supplied to an input 112 of a buck controller multiplier 113 via a line 114 from a resistor divider 116 which includes serially connected resistors 118, 119.

The error amplifier 90 generates an amplified error signal $V_c$ in an error amplifier output line 120 that is proportional to the determined difference between the output voltage signal $V_o$ and the set point voltage signal SP. The amplified error signal $V_c$ or the error amplifier output is supplied to an inverting input pin 122 of the buck controller 64 via a resistor divider 124 including serially connected resistors 426, 128. The amplified error signal $V_c$ is also supplied to a compensation input pin 130 of the buck controller 64 via the resistors 126, 128. A compensation network 131 is placed between the inverting and compensation pins 122, 130 to achieve stability of the voltage control loop and ensure high power factor.

A voltage output 132 of the buck switch 64 outputs a pulse width modulated signal 1 $V_{PWM}$. The pulse width modulated signal is supplied to the buck switch 66 via a resistor 134.

A comparator non-inverting input 136 receives the PWM voltage signal $V_{PWM}$ from a resistor 138 serially connected to the buck switch 66. The PWM voltage signal $V_{PWM}$ is proportional to the current flowing through the buck switch 66 and first inductor 74 during the conduction period of the buck switch 66. The voltage signal $V_{PWM}$ is compared to the internal reference voltage signal, which is determined by the control voltage signal $V_x$. When the voltage signal $V_{PWM}$ is equal to the internal reference voltage signal, the buck controller 64 turns the buck switch 66 OFF.

As a result, the PWM voltage signal $V_{PWM}$ determines the peak current through the buck switch 66, which establishes how much current is fed into the inverter 44.

Figure 3:
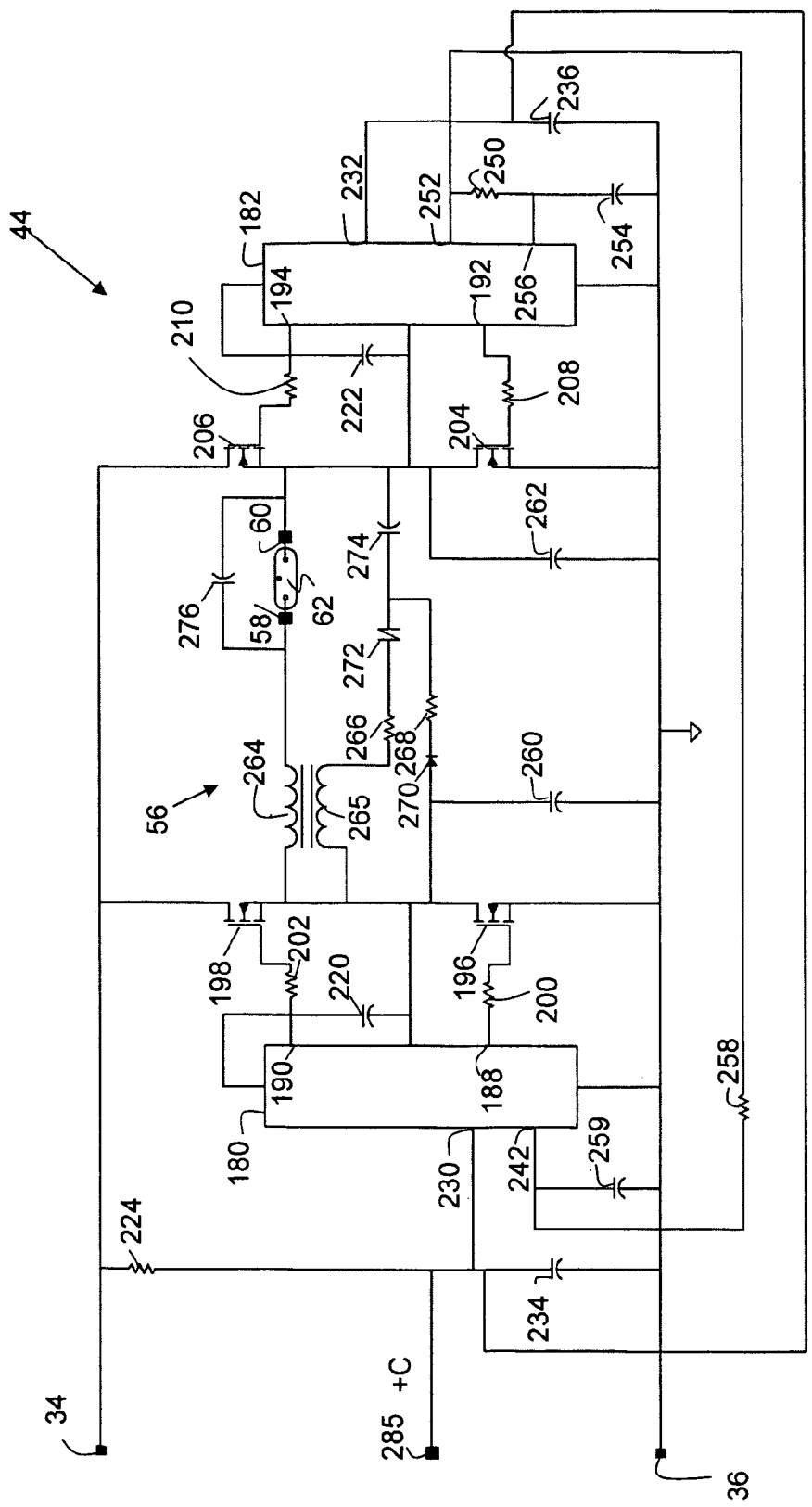
FIG. 3 is a diagrammatic illustration of another detailed portion of the ballast.

With continuing reference to FIG. 1 and further reference to FIG. 3, the inverter 44 is connected to the output terminals 34, 36 of the buck converter 20 for inverting the DC voltage supplied by the buck converter 20 into the AC voltage and providing the AC current to drive the lamp 62. The inverter 44 includes first and second drivers 180, 182 such as, for example, manufactured by ST Electronics, PN L6269A. Each driver 180, 182 includes a corresponding pair of first and second low and high side buffers 188, 190, 192, 194. First lower and upper switches 196, 198 is each connected to a corresponding first low, high side buffer 188, 190 through a respective resistor 200, 202. Second lower and upper switches 204, 206 is each connected to a corresponding second low, high side buffer 192, 194 through a respective resistor 208, 210.

Each buffer pair drives in a complementary fashion corresponding first lower and upper switches 196, 198 and second lower and upper switches 204, 206. The first and second lower and upper switches 196, 198, 204, 206 are controllably conductive devices such as, for example, MOSFETs. The first lower switch 196 is connected in series to the first upper switch 198 which is connected to the first high side buffer 190. The second lower switch 204 is connected in series to the second upper switch 206 which is connected to the second high side buffer 194. When the first and second lower switches 196, 204 are ON, the power to corresponding first and second high side buffers 190, 194 is supplied. When the first and second lower switches 196, 204 are OFF, the power to the first and second high side buffers 190, 194 is supplied through corresponding first and second side charging capacitors 220, 222. The first and second lower switches 196, 204 and first and second upper switches 198, 206 are turned ON alternatively to replenish charge on the corresponding charging capacitor 220, 222.

The converter bus voltage $V_s$ to the first and second drivers 180, 182 is supplied via a power line resistor 224 via the terminal 34 to corresponding first and second power pins 230, 232. The resistor 224 is connected in series with corresponding first and second electrolytic storage capacitors 234, 236. The resistor 224 provides the initial power to the drivers 180 and 182. The capacitors 234 and 236 charge via the resistor 224 and the DC bus via the terminal 34. When the voltage at the first power pin 230 surpasses the undervoltage lock-out voltage of the drivers 180 and 182, the oscillator of the second driver 182 begins to operate. An oscillator timing resistor 250 is connected to an oscillator timing resistor pin 252 of the second driver 182. An oscillator timing capacitor 254 is connected to the oscillator timing capacitor pin 256 of the second driver 182. The oscillator timing resistor and capacitor 250, 254 cooperate to determine the oscillating frequency of the second driver 182. A resistor 258 is connected between a capacitor 259 and the oscillator output of the second driver 182. The capacitor 259 and resistor 258 provide a slight delay to prevent the low and high side buffers 188, 190 of the first driver 180 from conducting simultaneously, thus preventing the first lower and upper switches 196 and 198 from turning ON simultaneously. This prevents the DC bus from being shorted by the first lower and upper switches 196 and 198. The resistor 250 and capacitor 254 of the oscillator circuitry of the second driver 182 set the frequency at which the lamp 62 is operated such as about 130 Hz, which is a substantially slower frequency than the switching frequency of the buck stage. First and second snubber capacitors 260, 262 are connected in parallel to corresponding first and second lower switches 196, 204 to allow the inverter 44 to operate with zero voltage switching.

A first inductor 264 is mutually coupled to a second inductor 265. The first inductor 264 is connected to the first upper switch 198 and the first output lamp terminal 58. The second inductor 265 is connected to the first upper switch 198 and to the second upper switch 206 via serially connected output circuit resistor 266, element 272 and capacitor 274. The second upper switch 206 is connected in series to the second output lamp terminal 60. An output circuit resistor 268 and a serially connected output circuit diode 270 are connected in parallel to the first and second inductors 264, 265. A capacitor 276 is connected in parallel to the lamp outputs 58, 60. The elements of the output circuit 56 cooperate to ignite the lamp 62 and to provide the initial warm up current and a predetermined alternating current voltage during normal lamp operation. The inductor 264 also attenuates the high frequency ripple current produced from the previous buck stage.

Figure 4:
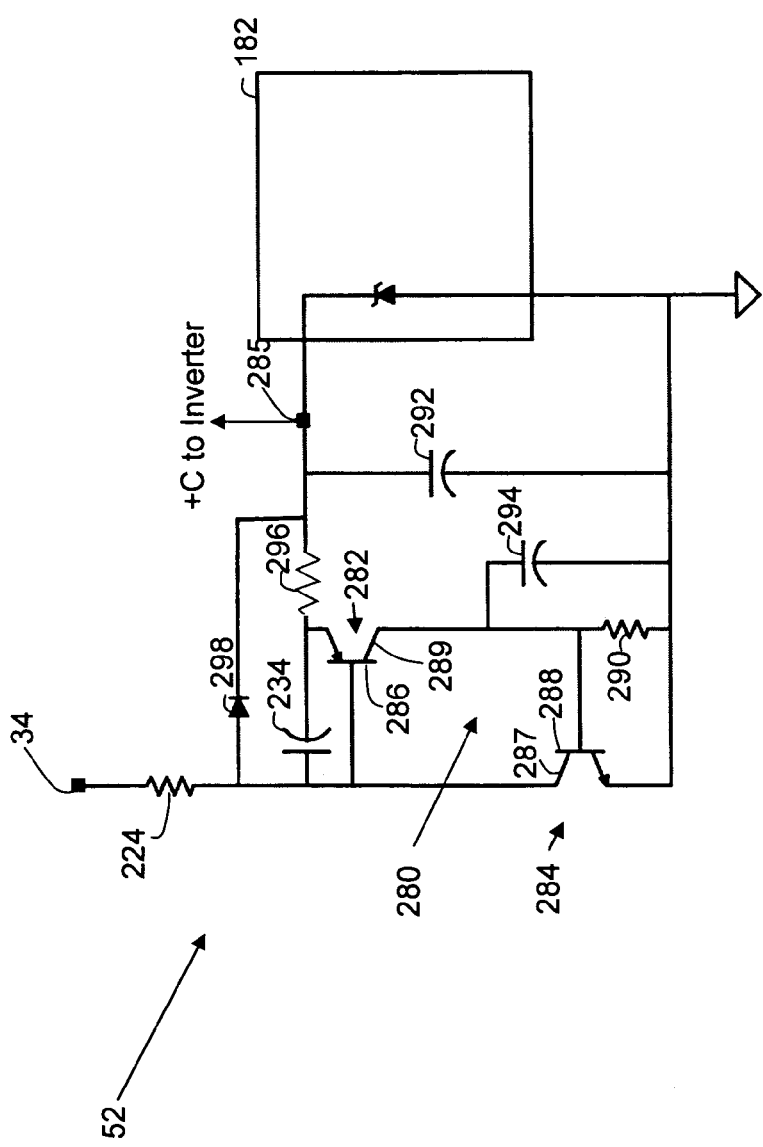
FIG. 4 is a diagrammatic illustration of another detailed portion of the ballast.

With continuing reference to FIGS. 1 and 3 and further reference to FIG. 4, the short circuit protection circuit 52 is connected between the buck converter 20 and inverter 44 to detect the converter bus voltage $V_s$ and shut down the inverter 44 when a low voltage condition, such as about 20V, is detected. Although only the first driver 182 is illustrated for simplicity, it is contemplated that the short circuit protection circuit 52 controls the first and second drivers 182, 184 in the like manner. When the lamp 62 is cold, just after ignition, the lamp 62 is characterized by a low impedance. In this condition, the lamp 62 is practically in a short circuit, e.g. the voltage between the lamp terminals 58, 60 can be about 20V. Typically, the inverter 44 starts running before the lamp 62 ignites, e.g. the output terminals of the inverter are open prior to ignition. When the lamp ignites, the lamp's impedance quickly drops to about 5% of its stead-state value. Generally, activation of the short-circuit protection circuit is not desirable during the low output voltage mode. As the gas temperature increases in the full arc mode, the lamp voltage increases until it reaches a steady-state voltage. If the output of the inverter 44 is shorted, for example, as the result of a faulty ballast installation process, the first and second lower and upper switches 196, 198, 204, 206 may overheat and also thermally stress the first switch 66 of the buck converter 20. The short circuit protection circuit 52 detects the undervoltage, e.g., the voltage which is, for example, less than 20V, and shuts down the inverter 44 thus eliminating the effect of the short circuit that causes the switches 66, 196, 198, 204, 206 to overheat. The inverter is shut down by shorting the supply voltage pins 230, 232 of the drivers 180 and 182.

More specifically, the short circuit protection circuit 52 includes a latch 280 including first and second latch transistors 282, 284. The latch 280 senses the converter bus voltage $V_s$, which is supplied to the latch 280 via the power line resistor 224.

During the normal lamp operation, the first and second drivers 180, 182 drive the lower and upper switches 196, 198, 204, 206. If the converter bus voltage $V_s$ drops below a predetermined threshold, such as 15V or 20V, current is drawn from a base 286 of the first latch transistor 282. A collector 287 of the second transistor 284 is connected to the base 286 of the first transistor 282. A base 288 of the second transistor 284 is connected to a collector 289 of the first transistor 282. When the current is drawn from the first transistor base 286, the current is also drawn from the second transistor base 288. The latch 280 is triggered. E.g., the first and second latch transistors 282, 284 are turned ON via a regenerative process.

When in conduction, the first and second latch transistors 282, 284 discharge the energy of the first and second storage capacitors 234, 236, causing the under-voltage lockout circuit of the first and second drivers 180, 182 to engage, thus shutting off the inverter 44. When the storage capacitors 234, 236 are almost completely discharged to about 1 or 2V, the latch 280 opens. Since the inverter is being shut-off, the converter bus voltage $V_s$ at this time is at high voltage, and the storage capacitors 234, 236 are charging via the power line resistor 224. When the storage capacitors 234, 236 charge to the voltage at which the first and second drivers 180, 182 are activated, about 8 to 9V, the drivers 182, 184 are turned ON and start operating the switches 196, 198, 204, 206 thereby causing the converter bus voltage $V_s$ to discharge into the output short circuit or the low impedance that causes the converter bus voltage $V_s$ to drop below 15V or 20V. The latching process repeats, shutting off the inverter 44 and protecting the switches 66, 196, 198, 204, 206. The duty cycle of this process is essentially determined by how long it takes to charge up the storage capacitors 234, 236 via the power line resistor 224. In one embodiment, the short circuit protection circuit 52 has a very short duty cycle. In such circuit, the ON time of the inverter under this condition is very short compared with period of process. When the short circuit is removed, the inverter restarts. The process of ignition, warm-up and steady-state control of the lamp power resumes.

A resistor 290, connected between the second transistor base 288 and ground, determines the level of current to trip the latch 280. Capacitors 292, 294 help to eliminate false triggering by acting as a low pass filter. A resistor 296 is connected in series with the storage capacitors 234, 236 to limit the current to the latch 280. In one embodiment, a diode 298 is connected in parallel with the storage capacitors 234, 236 to prevent the base-emitter junction of the first latch transistor 282 from breaking down.

With reference again to FIG. 2, the crest factor reduction circuit 46 detects a rate of the voltage change of the converter bus. More specifically, as the sense voltage $V_s$ increases during the inverter's transition intervals, a pulse is applied to a capacitor 300, which is coupled to the buck converter positive terminal 34. The capacitor 300, which is coupled to a base of the transistor 302, turns the transistor 302 ON. The transistor 302 pulses the control voltage signal $V_x$ at the buck converter controller pin 112 via a resistor 304 to nearly zero volts, thus blanking the voltage set point to the buck converter 20 before the voltage substantially rises. If no positive going transient occurs at the output of the buck converter 20, i.e. no positive going transition of the converter bus voltage $V_s$, the transistor 302 does not turn ON. The converter bus voltage $V_s$ stays undisturbed, thus providing the required set point voltage to the buck converter 20 to achieve the correct output current. Resistors 306, 308 are serially connected between the capacitor 300 and a base of the transistor 302. A diode 310 is coupled to the resistor 306 and an emitter of the transistor 302. A collector of the transistor 302 is connected to a power output 312 of the error amplifier 90.

In this manner, blanking or modulating the control voltage signal $V_x$ at the buck converter controller pin 112 during the transition intervals of the inverter 44 blanks the output current of the buck converter 20 before the bus voltage rises, thus reducing the current provided to the inverter 44 until the inverter's transition is over. E.g., the higher rate of the voltage change is detected before the voltage substantially changes. This greatly reduces the overshoot of the buck converter output voltage, thus substantially reducing the lamp current crest factor from about 1.0 to about 1.5.

The ripple detection circuit 50 measures an AC component in the converted DC voltage. As described above, the set point amplifier 100 receives the input voltage signal $V_b$, which is together with the provided reference voltage signal $V_R$ determines the voltage set point SP for the buck converter 20 and consequently, how much power is drawn from the DC bus. The ripple detection circuit 50 includes a resistor 400 connected in series with a capacitor 402. A resistor 404 is connected in parallel with the resistor 400 and capacitor 402. The resistor 102 is connected in series with the resistor 400 and capacitor 402. The resistors 102, 400, 404, capacitor 402 and set point amplifier 100 cooperate to measure the AC component in the input DC voltage $V_b$ and modulate the buck converter controller 64 via the control voltage signal $V_x$ at the buck converter controller pin 112 so that the correct level and phase of the modulation to reject the AC component of the DC voltage are provided to the buck converter controller 64. In this manner, the AC component is measured and attenuated.

The application has been described with reference to the preferred embodiments. Obviously, modifications and alterations will occur to others upon reading and understanding the preceding detailed description. It is intended that the application be construed as including all such modifications and alterations.

What is claimed is:

1. A continuous mode electronic ballast for operating a lamp comprising:
    a buck converter configured to generate a direct current (DC) bus voltage at a buck converter output;
    an inverter circuit operationally coupled to the buck converter configured to receive the generated DC voltage and convert the DC voltage into an alternating current (AC) voltage to drive the lamp;
    a power control circuit operationally coupled to the buck converter and configured to provide a control voltage signal to the buck converter so that the buck converter generates the output DC voltage and current of a predetermined value; the power control circuit including, a set point amplifier which includes: a first input connected to a line input voltage line, and a second input which is provided with a reference voltage, wherein the set point amplifier generates a voltage set point signal based on the line input voltage and reference voltage, the control voltage signal being generated based on the voltage set point signal;
    a crest factor reduction circuit operationally coupled to (a) the buck converter output to sense a rate of change in the generated DC bus voltage, and (b) the power control circuit to modify the control voltage signal based on the sensed rate of change in the DC bus voltage, wherein the modified control voltage signal forces the buck converter to generate the DC voltage, which when converted to the AC voltage, results in a current crest factor of lamp to be equal from about 1 to about 1.5.

2. The ballast as set forth in claim 1, wherein the lamp current crest factor is equal to about 1.

3. The ballast as set forth in claim 1, wherein the voltage control signal is set to 0V for a predetermined period of time to prevent the DC bus voltage from rising.

4. The ballast as set forth in claim 1, wherein the crest factor reduction circuit includes:
    a transistor which modulates the control voltage signal so that the control voltage signal is one of (a) set to 0V when the transistor is ON and (b) provides no modification to the control voltage signal when the transistor is OFF.

5. The ballast as set forth in claim 4, wherein the crest factor reduction circuit further includes:
    a capacitor which is operationally coupled to the buck converter output and the transistor and turns the transistor ON and OFF.

6. The ballast as set forth in claim 4, wherein the buck converter output current is reduced while the transistor is ON.

7. The ballast as set forth in claim 1, wherein the power control circuit and crest reduction factor circuit cooperate to generate a duty cycle, at which the buck converter output is periodically turned OFF to reduce the buck converter output current.

8. The ballast as set forth in claim 7, wherein the reduced output current is generated by one of:
    supplying a zero value voltage control signal to the buck converter while the increased rate of voltage change is sensed, and
    supplying unmodified voltage control signal to the buck converter for the rest of the cycle.

9. The ballast as set forth in claim 8, wherein the reduced buck converter output current generates a lamp current crest factor of less than 1.5.

10. The ballast as set forth in claim 1, further including:
    a buck converter controller which includes:
        a multiplier which receives the voltage control signal, modifies the voltage control signal and outputs the buck output voltage to control a lamp voltage at a predetermined level.

11. A continuous mode electronic ballast for operating a lamp comprising:
    a buck converter configured to generate a direct current (DC) bus voltage at a buck converter output;
    an inverter circuit operationally coupled to the buck converter configured to receive the generated DC voltage and convert the DC voltage into an alternating current (AC) voltage to drive the lamp;
    a power control circuit operationally coupled to the buck converter and configured to provide a control voltage signal to the buck converter so that the buck converter generates the output DC voltage and current of a predetermined value, the power control circuit including,
    a set point amplifier which includes:
        a first input connected to a line input voltage line, and
        a second input which is provided with a reference voltage, wherein the set point amplifier generates a voltage set point signal based on the line input voltage and reference voltage, the control voltage signal being generated based on the voltage set point signal;

an error amplifier which receives the buck output voltage and set point voltage signals at an input terminal, compares the set point voltage signal with the buck output voltage signal, and based on the comparison, generates an amplified error signal representative of a difference between the buck output and set point voltage signals; and a crest factor reduction circuit onerationally coupled to (a) the buck converter output to sense a rate of change in the generated DC bus voltage, wherein the modified control voltage signal forces the buck converter to generate the DC voltage, which when converted to the AC voltage, results in a current crest factor of lamp to be equal from about 1 to about 1.5 and (b) the power control circuit to modify the control voltage signal based on the sensed rate of change in the DC bus voltage.

12. The ballast as set forth in claim 11, wherein the buck converter controller further includes:

a compensation network which receives the amplified error signal and compensates the control voltage signal based on the received amplified error signal.

13. A continuous mode electronic ballast for operating a lamp comprising:

a buck converter configured to generate a DC bus voltage at a buck converter output;

an inverter circuit operationally coupled to the buck converter configured to receive the generated DC voltage and convert the DC voltage into an AC voltage to drive the lamp;

a power control circuit operationally coupled to the buck converter and configured to provide a control voltage signal to the buck converter so that the buck converter generates the DC voltage and current of a predetermined value which power control circuit includes:

a set point amplifier, a first input of which is connected to a line input voltage line and a second input of which is provided with a reference voltage, which set point amplifier generates a voltage set point signal based on the line input voltage and reference voltage, and a resistor divider one end of which is connected in series with the output of the set point amplifier which resistor divider determines a ratio of the set point voltage signal provided to the buck converter; and a crest factor reduction circuit operationally coupled (a) to the buck converter output to sense a rate of change in the generated DC bus voltage and (b) to the power control circuit to modify the control voltage signal based on the sensed rate of change in the DC bus voltage, wherein the modified control voltage signal forces the buck converter to generate the DC voltage, which when converted to the AC voltage, results in a current crest factor of lamp to be equal from about 1 to about 1.5.

14. The ballast as set forth in claim 13, wherein the lamp current crest factor is equal to about 1.

15. The ballast as set forth in claim 13, wherein the voltage control signal is set to 0V for a predetermined period of time to prevent the DC bus voltage from rising.

16. The ballast as set forth in claim 13, wherein the crest factor reduction circuit includes:

a transistor which modulates the control voltage signal so that the control voltage signal is one of (a) set to 0V when the transistor is ON and (b) provides no modification to the control voltage signal when the transistor is OFF.

17. The ballast as set forth in claim 16, wherein the crest factor reduction circuit further includes:

a capacitor which is operationally coupled to the buck converter output and transistor and turns the transistor ON and OFF.

18. The ballast as set forth in claim 17, wherein the buck converter output current is reduced while the transistor is ON.

* * * * *